United States Patent
Bauer et al.

(10) Patent No.: US 6,964,192 B2
(45) Date of Patent: Nov. 15, 2005

(54) METHOD AND DEVICE FOR MONITORING A TORQUE OF A DRIVE UNIT OF A VEHICLE

(75) Inventors: Torsten Bauer, Homburg/Saar (DE); Stefan Keller, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 10/477,402

(22) PCT Filed: Sep. 12, 2002

(86) PCT No.: PCT/DE02/03409
§ 371 (c)(1),
(2), (4) Date: Nov. 12, 2003

(87) PCT Pub. No.: WO03/076785
PCT Pub. Date: Sep. 18, 2003

(65) Prior Publication Data
US 2005/0000276 A1 Jan. 6, 2005

(30) Foreign Application Priority Data
Mar. 12, 2002 (DE) .......................... 102 10 684

(51) Int. Cl.$^7$ .............................................. G01M 15/00
(52) U.S. Cl. ....................................................... 73/117.3
(58) Field of Search ................................ 73/116, 117.2, 73/117.3, 118.1; 701/29, 84, 87, 90

(56) References Cited

U.S. PATENT DOCUMENTS

| | | | |
|---|---|---|---|
| 5,692,472 A | 12/1997 | Bederna et al. | |
| 6,032,644 A | 3/2000 | Bederna et al. | |
| 6,223,721 B1 | * 5/2001 | Bauer et al. | ................. 123/399 |
| 6,247,445 B1 | 6/2001 | Langer | |
| 6,251,044 B1 | 6/2001 | Streib | |
| 6,368,248 B1 | * 4/2002 | Bauer et al. | ................. 477/111 |
| 6,386,180 B1 | * 5/2002 | Gerhardt et al. | ............. 123/350 |
| 2004/0103719 A1 | * 6/2004 | Raftari et al. | ............... 73/118.1 |

FOREIGN PATENT DOCUMENTS

| | | |
|---|---|---|
| DE | 195 36 038 | 4/1997 |
| DE | 197 29 100 | 1/1999 |
| DE | 197 42 083 | 3/1999 |
| DE | 198 36 845 | 2/2000 |
| DE | 100 34 871 | 2/2002 |

* cited by examiner

Primary Examiner—Eric S. McCall
(74) Attorney, Agent, or Firm—Walter Ottesen

(57) ABSTRACT

A method and an arrangement for monitoring a torque of a drive unit (1) of a vehicle (5) are suggested. The method and arrangement make possible a reliable detection of a fault condition for an essentially constant actuation of an operator-controlled element. The torque, which is to be monitored, is compared to a permissible torque. The permissible torque is readjusted to the torque, which is to be monitored. A fault is detected when the torque, which is to be monitored, deviates from the permissible torque by more than a first pregiven value. The fault is only detected for the case wherein a position of an operator-controlled element, especially an accelerator pedal position, lies within a pregiven tolerance range at least since a first pregiven time.

13 Claims, 3 Drawing Sheets

METHOD AND DEVICE FOR MONITORING A TORQUE OF A DRIVE UNIT OF A VEHICLE

RELATED APPLICATION

This application is the national stage of PCT/DE 02/03409, filed Sep. 12, 2002, designating the United States.

FIELD OF THE INVENTION

The invention relates to a method and an arrangement for monitoring a torque of a drive unit of a vehicle. It is already known to monitor a torque of a drive unit of a vehicle. In this torque monitoring, a permissible actual torque, which results essentially from an engine rpm and an accelerator pedal angle, is compared to an actual torque computed from motor variables. These motor variables are the ignition angle, the engine rpm and data as to the load of the drive unit. In operating states in which the driver of the vehicle requests an essentially constant torque from the drive unit over a longer time, that is, for a depressed accelerator pedal position which is, however, constant, the driver is not prepared for a sudden torque change. The monitoring of such operating states is insofar difficult because a difference between the permissible torque and the torque to be monitored is present caused by tolerances which are not the same for all vehicles. The task of the invention is therefore to improve the monitoring of such operating states.

SUMMARY OF THE INVENTION

The method of the invention and the arrangement of the invention for monitoring a torque of a drive unit of a vehicle afford the advantage with respect to the foregoing that the torque to be monitored is compared to a permissible torque and that the permissible torque is readjusted to the torque to be monitored and that a fault is detected when the torque, which is to be monitored, deviates from a permissible torque by more than a first pregiven value and that the fault is detected only in the case wherein a position of an operator-controlled element (especially an accelerator pedal position) lies within a pregiven tolerance range at least since a first pregiven time. In this way, and for an essentially constant position of an operator-controlled element, the spacing between the permissible torque and the torque to be monitored is adapted. In this way, the monitoring of static operating states wherein the driver of the vehicle does not expect a change of the torque to be monitored is facilitated. The initiation of a corresponding fault reaction is therefore already possible at an early time.

It is especially advantageous that the fault is detected when the deviation results within a second pregiven time. In this way, it is prevented that the deviation is reduced by readjusting the permissible torque before a fault can be detected.

BRIEF DESCRIPTION OF THE DRAWING

The invention will now be explained with reference to the drawings wherein.

DESCRIPTION OF THE PREFERRED EMBODIMENT OF THE INVENTION

Figure 1:
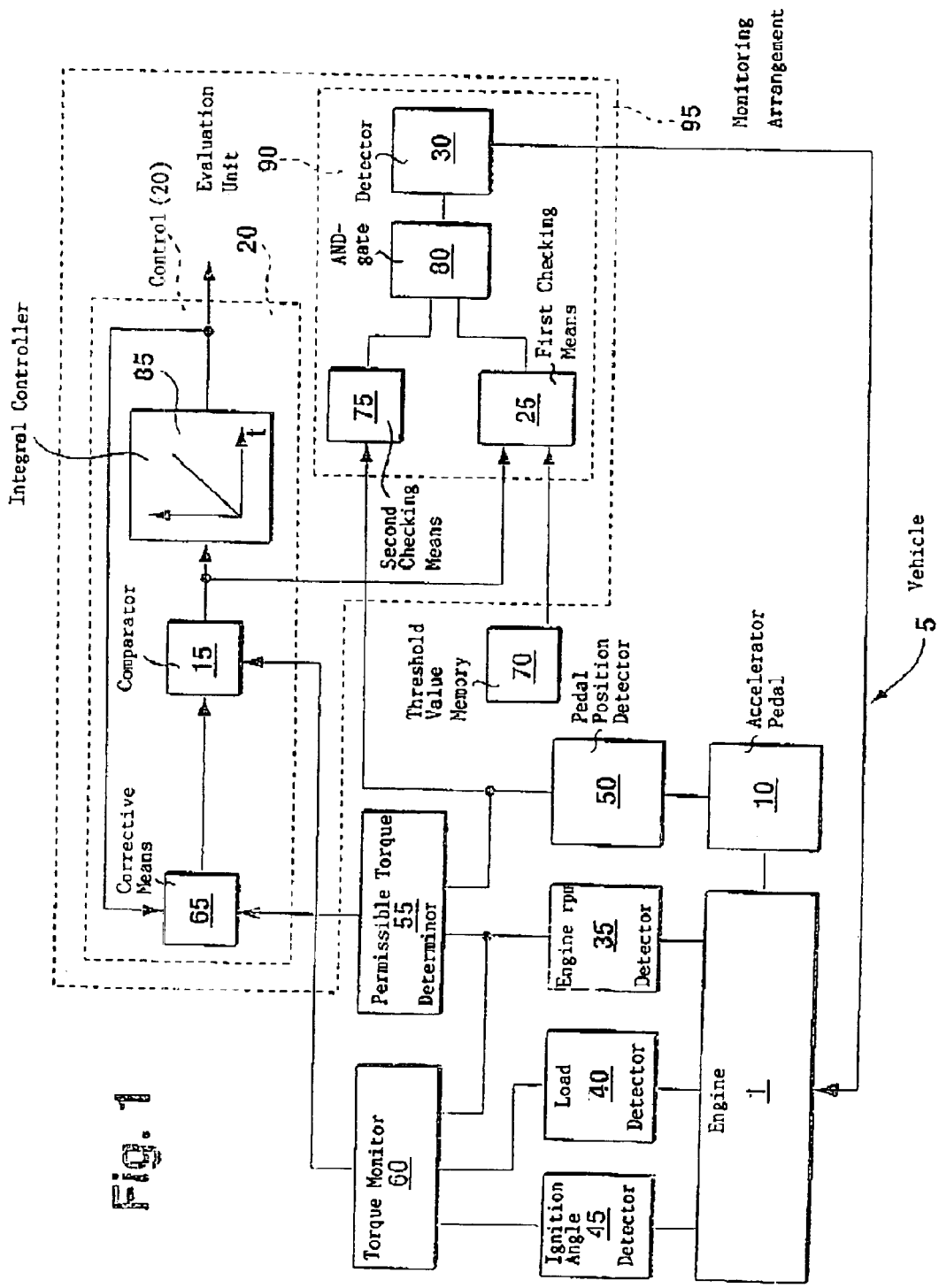
FIG. 1 shows a block diagram of an arrangement of the invention.

In FIG. 1, 5 identifies a vehicle of which only the parts, which are essential for the description of the invention, are shown in FIG. 1 in the form of a block circuit diagram. The vehicle 5 includes a drive unit 1, for example, an internal combustion engine. An operator-controlled element 10 is connected to the drive unit 1 and this operator-controlled element is configured as an accelerator pedal in the following by way of example. Furthermore, means 35 for detecting an engine rpm of the drive unit 1 are provided. In addition, means 40 are provided for detecting a load which is to be driven by the drive unit 1. In addition to the actual drive of the vehicle via the drive wheels, the load can be ancillary equipment such as a climate control system, an automobile radio, an electrical sliding roof or the like which are likewise driven by the drive unit 1.

Means 45 for detecting an ignition angle are provided for the case that the drive unit is an internal combustion engine which is assumed in the following as an example. An ignition angle degree of efficiency of the internal combustion engine 1 can be determined via the ignition angle. This can likewise take place via the means 45.

Further, means 50 are provided for detecting the position of the accelerator pedal 10. The means 50 are operatively connected to the accelerator pedal 10 and the means 35, 40 and 45 are operatively connected to the internal combustion engine 1. The means 35, 40 and 45 are furthermore connected to means 60 for determining a torque to be monitored. The torque to be monitored can, for example, be the torque outputted by the engine 1. The means 35 and 50 are connected to means 55 for determining a permissible torque of the engine 1. The permissible torque of the engine can, for example, likewise be the torque outputted by the engine 1. The permissible torque is determined in dependence upon the position of accelerator pedal 10 and the engine rpm. In contrast, the torque, which is to be monitored, is determined by means 60 from the engine rpm, the load and/or the ignition angle of the engine 1 and especially by means of a characteristic field. In principle, the torque, which is to be monitored, should match the permissible torque. As a rule, however, a difference occurs because of tolerances between the torque to be monitored and the permissible torque which difference is different from one vehicle to another.

The means 55 are connected to corrective means 65 so that the determined permissible torque is supplied to the corrective means 65. The means 60 are connected to the means 15 for comparison so that the determined torque, which is to be monitored, is supplied to the means 15. The means 15 and the corrective means 65 are components of means 20 for the control which includes furthermore an integral controller 85. Furthermore, a corrective value is supplied to the corrective means 65. The corrective means 65 corrects the permissible torque by the supplied corrective value in the sense of a readjustment to the torque to be monitored. For this reason, the corrected permissible torque, which is generated by the corrective means 65, is supplied to the means 15.

The means 15 compares the corrected permissible torque to the torque to be monitored in that the means 15, for example, forms the difference of the corrected permissible torque and the torque to be monitored and supplies the difference value to the integral controller 85. From the difference value, the integral controller 85 determines the corrective value, which is supplied to the corrective means 65, and is made available at an output of the means 20. The object of the means 20 is to control to zero the difference value between the corrected permissible torque and the torque to be monitored. In addition, the difference value is supplied to the first means 25 for checking. Furthermore, a first pregiven value from a threshold value memory 70 is supplied to the first checking means 25. If the difference value in magnitude is greater than the first pregiven value, then an output of the first checking means 25 is set. Furthermore, second checking means 75 are provided which are connected to the means 50 and the determined position of the accelerator pedal 10 is supplied to the means 50.

The second checking means 75 checks whether the position of the accelerator pedal 10 lies within a pregiven tolerance range at least since a first pregiven time. If this is the case, then the output of the second checking means 75 is likewise set. Otherwise, the output of the second checking means 75 is not set. For the case that the difference value, which is outputted by the means 15, is less or equal to the first pregiven value, the output of the first checking means 25 is likewise unset. The output of the first checking means 25 and the output of the second checking means 75 are each supplied to an input of an AND-gate 80 whose output is connected to the means 30 for detection. The output of the AND-gate 80 is only set when both its inputs, that is, the output of the first checking means 25 and the output of the second checking means 75, are set. The means 30 for detection detects a fault condition when the output of the AND-gate 80 is set. The means 30 for detection are furthermore connected to the drive unit 1 and initiate a fault reaction for the drive unit 1 when a fault condition is detected. The means 30, the AND-gate 80, the first checking means 25 and the second checking means 75 form an evaluation unit 90 which, together with the means 20 for control, form the arrangement 95 of the invention.

Figure 2:
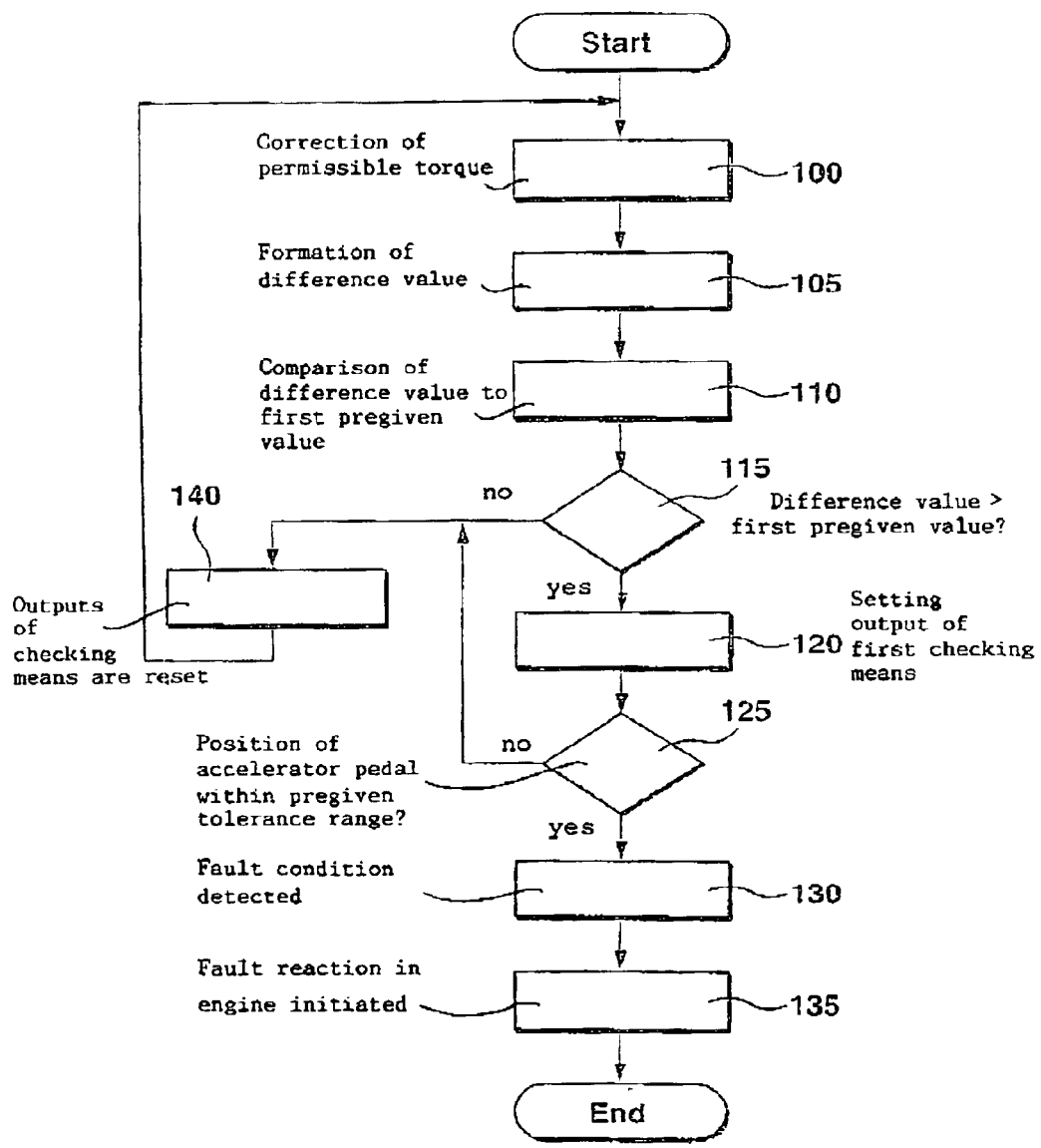
FIG. 2 shows a flowchart of the method of the invention.

The method of the invention will now be explained with respect to the flowchart of FIG. 2. At the start of the program, the corrective value is set to zero. Thereafter, the program branches to a program point 100. At program point 100, the corrective means 65 corrects the permissible torque by the corrective value, for example, by means of a difference formation. Thereafter, the program branches to program point 105. At program point 105, the means 15 compares the corrected permissible torque to the torque, which is to be monitored, by forming the difference value. Thereafter, the program branches to program point 110.

At program point 110, the first checking means 25 compares the difference value to the first pregiven value. Thereafter, the program branches to program point 115.

At program point 115, the first checking means 25 checks whether the difference value is greater than the first pregiven value. If this is the case, then the program branches to program point 120; otherwise, the program branches to program point 140. At program point 120, the output of the first checking means 25 is set. Thereafter, the program branches to program point 125.

At program point 125, the second checking means 75 checks whether the position of the accelerator pedal lies within the pregiven tolerance range at least since the first pregiven time. If this is the case, then the program branches to program point 130; otherwise, the program branches to program point 140.

At program point 130, the output of the second checking means 75 is set and a fault condition is detected in the means 30. Thereafter, the program branches to program point 135.

At program point 135, the means 30 initiates a fault reaction at the internal combustion engine 1. Thereafter, there is a movement out of the program. At program point 140, the outputs of the first checking means 25 and the second checking means 75 are reset and a new corrective value for the corrective means 65 in the sense of a readjustment of the permissible torque to the torque, which is to be monitored, is determined and the program branches back to program point 100. The new corrective value is determined by the integral controller 85 from the difference value determined at program point 105.

As described, a difference between the permissible torque and the torque to be monitored exists for an essentially constant position of the accelerator pedal 10. With the means 20 for control, the permissible torque is corrected by the corrective value so long until the difference value of the corrected permissible torque and the torque to be monitored becomes zero. As described, the permissible torque results essentially from the position of the accelerator pedal 10 and the engine rpm and is thereby likewise constant at a constant position of the accelerator pedal 10. If the torque to be monitored increases impermissibly, then the difference value at the output of the means 15 becomes negative.

If the magnitude of the difference value exceeds the first pregiven value, then the means 30 detects a fault condition. Here, it is advantageous if the fault detection takes place via the means 30 within a second pregiven time after determining the difference value. The second pregiven time can, for example, be realized in that a time-delay element is connected ahead of the integral controller 85 which delays the formation of the corrective value by the integral controller 85 by the second pregiven time. The second pregiven time can be so selected that it corresponds at least to the running time which is required from the formation of the difference value by the means 15 up to setting or resetting at the output of the AND-gate 80 and the possible detection of a fault condition associated therewith by the means 30. In this way, it is prevented that the means 20 control the difference value to zero before a fault detection by the means 30 can take place and, in this way, a fault detection would be prevented.

Figure 3:
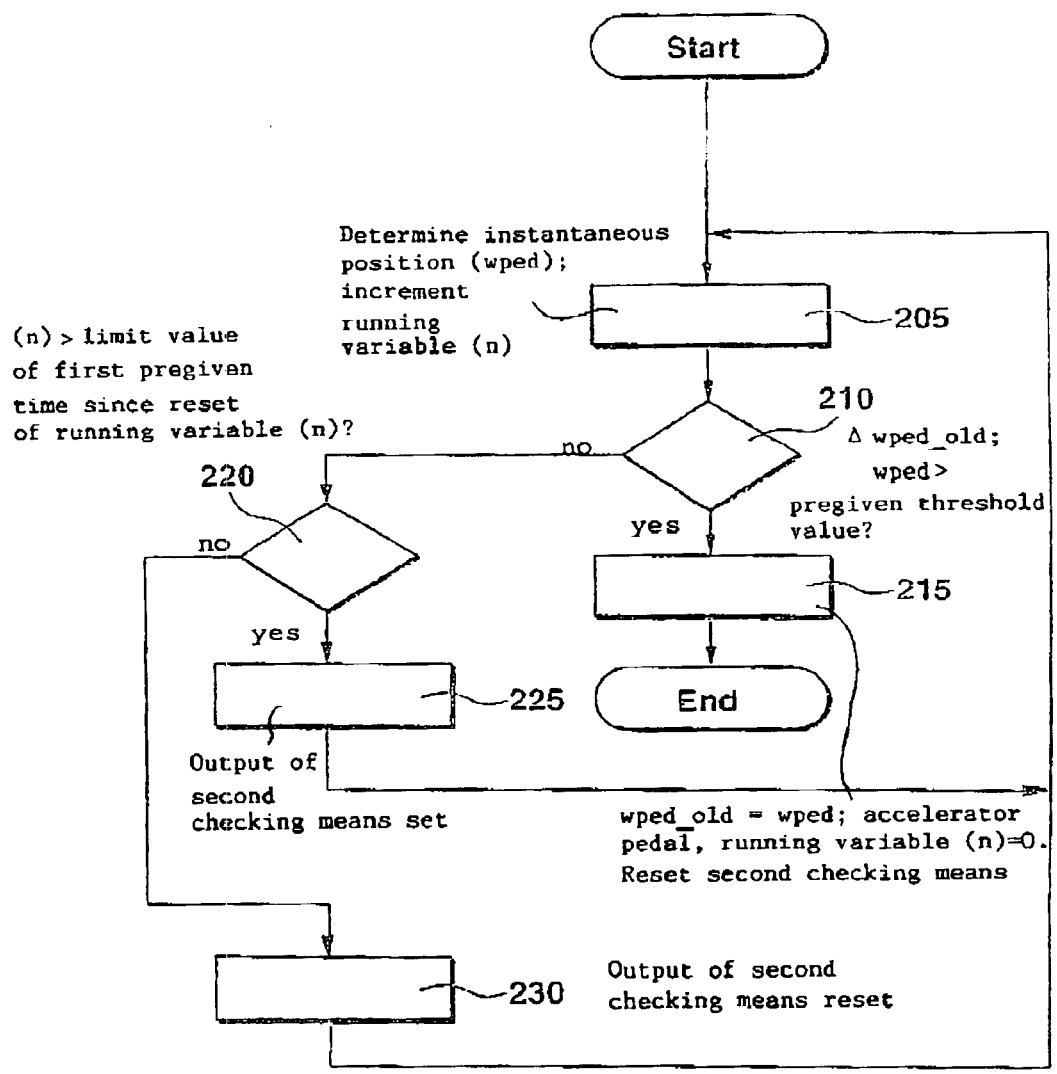
FIG. 3 shows a flowchart for the detection of an essentially constant position of an operator-controlled element.

As described, a detection of a fault condition is only provided for the case that an essentially constant position of the accelerator pedal 10 is present. For this reason, the detection of such a constant position of the accelerator pedal 10 by the second checking means 75 is important. This detection can take place, for example, based on the flowchart shown in FIG. 3.

After the start of the program, a position wped_old of the accelerator pedal 10, which was determined last by the means 50, is intermediately stored in a memory (not shown in FIG. 1) and a running variable (n) is set to zero. Thereafter, the program branches to program point 205. At program point 205, the means 50 determines the instantaneous position wped of the accelerator pedal 10 and increments the running variable (n). Thereafter, the program branches to a program point 210.

At program point 210, the second checking means 75 checks whether the magnitude of the difference of the last valid position $wped_{13}old$ and the instantaneous position wped of the accelerator pedal 10 is greater than a pregiven threshold value which forms a tolerance range for the position of the accelerator pedal 10. If this is the case, that is, the position of the accelerator pedal 10 lies outside of the pregiven tolerance range, then the program branches to program point 215; otherwise, the program branches to program point 220. At program point 215, the last-valid position $wped_{13}old$ is set to the instantaneous position wped of the accelerator pedal 10 and the running variable (n) is reset to zero. Thereafter, there is a movement out of the program and there is a renewed runthrough with the new value for the last-valid position $wped_{13}old$ if the internal combustion engine 1 was not switched off in the meantime.

The instantaneous value of the running variable (n) can, for example, be intermediately stored in the second checking means 75. At program point 220, the second checking means 75 checks whether (n) is greater than a limit value which represents a first pregiven time since the reset of the running variable (n). If this is the case, then the program branches to program point 225; otherwise, the program branches to program point 230. At program point 225, the output of the second checking means 75 is set. Thereafter, the program branches back to program point 205.

At program point 230, the output of the second checking means 75 is reset. Thereafter, the program branches back to program point 205. At program point 215, the output of the second checking means 75 is also reset.

The monitoring of the torque, which is outputted by the internal combustion engine 1, is advantageously carried out only outside of the idle state of the engine 1 because, in idle, any desired torque can be requested from an idle control of the engine 1.

If the torque, which is to be monitored, is the torque outputted by the engine 1 as set forth in the above example, that is, an actual torque, then, for a detection of the fault condition by the means 30, a first desired torque can be reduced as a fault reaction, and the actual torque is caused to track this desired torque. In this example, the first desired torque would be the torque to be outputted by the engine 1 which, for example, can be determined in a manner known per se in dependence upon the position of the accelerator pedal 10 and the torque request of further ancillary equipment or additional consumers such as a climate control system, an electric sliding roof, automobile radio or the like. If the difference value of the torque to be monitored and the corrected permissible torque is greater than a second pregiven value, which is greater than the first pregiven value, then as a fault reaction, also a switchoff of the fuel metering can be initiated, that is, a so-called safety fuel switchoff for the engine 1. This difference value is checked by the first checking means 25.

For the case wherein the torque to be monitored is a second desired torque, which, for example, can likewise be the torque to be outputted by the internal combustion engine 1 and therefore corresponds to the first desired value, a limiting of the second desired torque can be initiated by the means 30 when a fault condition is detected by the means 30.

The described embodiment is described based on a drive unit 1 formed as an internal combustion engine. The invention is, however, not limited to the use of an internal combustion engine for the drive unit 1; rather, the invention can be applied, to any desired drive units. Suitable measurement quantities of the drive unit 1 are determined for determining the torque to be monitored and suitable measuring devices should be provided.

What is claimed is:

1. A method for monitoring a torque of a drive unit of a vehicle, the method comprising the steps of:

comparing the torque to be monitored to a permissible torque;

readjusting said permissible torque to said torque to be monitored;

detecting a fault when the torque to be monitored deviates by more than a first pregiven value from said permissible torque; and, only detecting the fault in the case wherein a position of an operator-controlled element lies within a pregiven tolerance range at least since a first pregiven time.

2. The method of claim 1, comprising the further step of detecting the fault when the deviation results within a second pregiven time.

3. The method of claim 1, wherein, for the case wherein the torque to be monitored is an actual torque, the method comprises the further step of reducing a first desired torque when the fault is detected and causing said actual torque to track said first desired torque.

4. The method of claim 1, wherein, for the case wherein the torque to be monitored is an actual torque, the method comprises the further step of switching off a fuel metering when the fault is detected and when the second pregiven value is greater than the first pregiven value.

5. The method of claim 4, wherein said fault is detected when the torque to be monitored deviates from said permissible torque by more than a second pregiven value.

6. The method of claim 1, wherein, for the case wherein the torque to be monitored is a second desired torque, the second desired torque is limited with the detection of the fault.

7. The method of claim 1, wherein the torque to be monitored is determined in dependence upon an ignition angle, an engine rpm and/or data as to the load of the drive unit.

8. The method of claim 1, wherein the permissible torque is determined in dependence upon an engine rpm of the drive unit and the position of the operator-controlled element.

9. The method of claim 8, wherein the position of said operator-controlled element is the position of an accelerator pedal.

10. The method of claim 1, wherein the fault is detected only outside of the idle state of the drive unit.

11. The method of claim 1, wherein said position of said operator-controlled element is the position of an accelerator pedal.

12. An arrangement for monitoring a torque of a drive unit of a vehicle, the arrangement comprising:

means for comparing the torque to be monitored to a permissible torque;

control means for readjusting said permissible torque to the torque to be monitored;

first means for checking whether the torque to be monitored deviates from said permissible value by more than a first pregiven value;

detecting means for detecting a fault when said first means for checking determines a deviation going beyond the first pregiven value;

second means for checking whether the position of an operator-controlled element lies in a pregiven tolerance range at least since a first pregiven time; and, said detecting means being configured to detect the fault only in this case.

13. The arrangement of claim 12, wherein said position of said operator-controlled element is the position of an accelerator pedal.

* * * * *